United States Patent [19]
Matsugami et al.

[11] Patent Number: 5,929,928
[45] Date of Patent: Jul. 27, 1999

[54] DIGITAL IMAGE PROCESSOR

[75] Inventors: Toshiki Matsugami, Sagamihara; Toru Miyazaki, Yokohama, both of Japan

[73] Assignee: Kabushiki Kaisha Toshiba, Kawasaki, Japan

[21] Appl. No.: 08/843,238

[22] Filed: Apr. 14, 1997

[30] Foreign Application Priority Data

Apr. 15, 1996 [JP] Japan .................................. 8-092514

[51] Int. Cl.⁶ .................................................. H04N 5/445
[52] U.S. Cl. .......................... 348/563; 348/567; 348/569; 348/589; 345/141; 345/192
[58] Field of Search .................................... 348/567, 563, 348/564, 569, 589, 565, 465, 468; 345/141, 192, 193, 194, 26, 213, 467–472; H04N 5/445

[56] References Cited

U.S. PATENT DOCUMENTS

| Re. 34,809 | 12/1994 | Idei | 348/565 |
|---|---|---|---|
| 5,170,256 | 12/1992 | Tabata | 348/564 |
| 5,488,426 | 1/1996 | Pack | 348/564 |
| 5,499,054 | 3/1996 | Lim | 348/563 |
| 5,559,560 | 9/1996 | Lee | 348/465 |
| 5,583,577 | 12/1996 | Tsukagoshi | 348/564 |
| 5,623,316 | 4/1997 | Naito et al. | 348/569 |
| 5,644,363 | 7/1997 | Mead | 348/563 |
| 5,774,189 | 6/1998 | Ishii et al. | 348/563 |
| 5,805,237 | 9/1998 | Nakatni et al. | 348/589 |
| 5,812,212 | 9/1998 | Hamamatsu et al. | 348/564 |

FOREIGN PATENT DOCUMENTS 008154217  6/1996  Japan .

*Primary Examiner*—John K. Peng
*Assistant Examiner*—Linus H. Lo
*Attorney, Agent, or Firm*—Pillsbury Madison & Sutro LLP

[57] ABSTRACT

Pattern data is generated in accordance with horizontal and vertical synchronizing components of a video signal. The pattern data and the video signal are stored in a memory. The video signal is written in an effective image period, while pattern data is written in other periods. Write and read addresses for the memory are generated in accordance with the horizontal and vertical synchronizing components of the video signal. Thus, pattern data is written over the video signal corresponding to the position at which display is required. Whether the output read from the memory is a video signal or pattern data is discriminated by a signal discrimination circuit in accordance with the read address. Pattern data and the video signal are individually signal-processed. In accordance with a result of the discrimination performed by the signal discrimination circuit, the output from a pattern data processor and the output from a video signal processor are switched and displayed by a monitor.

10 Claims, 10 Drawing Sheets

PATTERN DATA

CODE DATA  0 0 1 0 0 0 0 0 0 0 1 (=A)

| PATTERN DATA | CONTROL DATA | |
|---|---|---|
| | 0 | 1 |
| 0 0 0 | BLACK | BROWN |
| 0 0 1 | BLUE | ORANGE |
| 0 1 0 | GREEN | PINK |
| 0 1 1 | CYAN | YELLOW GREEN |
| 1 0 0 | RED | OTHER NEUTRAL COLOR |
| 1 0 1 | MAGENTA | OTHER NEUTRAL COLOR |
| 1 1 0 | YELLOW | OTHER NEUTRAL COLOR |
| 1 1 1 | WHITE | OTHER NEUTRAL COLOR |
FIG. 4
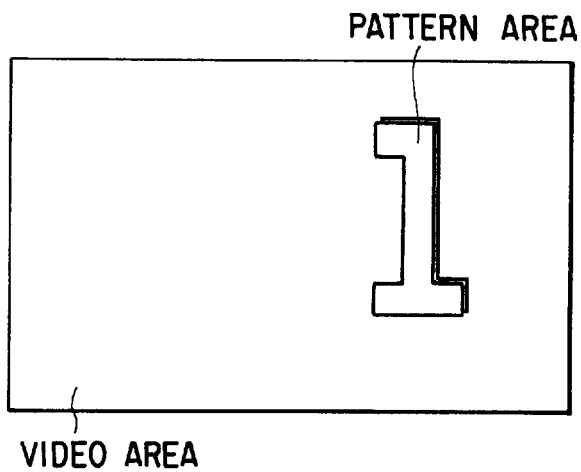
FIG. 5A
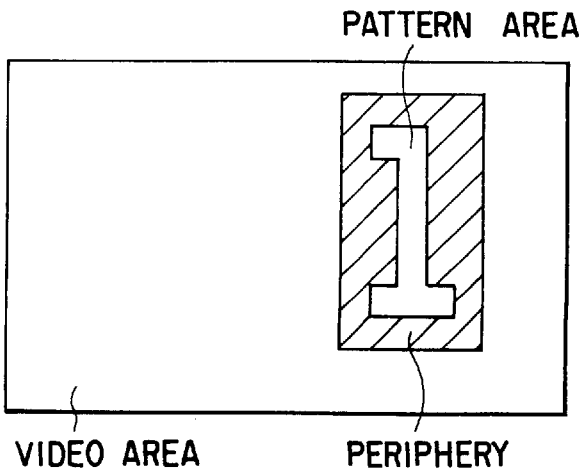
FIG. 5B

DIGITAL IMAGE PROCESSOR

BACKGROUND OF THE INVENTION

The present invention relates to a digital image processor capable of displaying, on a screen, a video signal and a character and/or graphic pattern using one memory.

This application is based on Japanese Patent Application No. 08-92514, filed Apr. 15, 1996, the content of which is incorporated herein by reference.

As has been known in recent years, raising of the integration degree and operation speed of digital LSI (Large-Scale Integrated) circuits, particularly, memory access rate, enlargement of the memory capacity and reduction in the cost have caused digital signal processes of video signals to be performed widely. The digital signal processing method has been widely employed also in the personal use television receivers. The main reason for this is that use of the digital signal processing method has realized a variety of additional values which cannot be realized by the analog system.

As a method of displaying characters and figures (for displaying the channel number, the sound volume level and the like) adapted to the television receiver of the foregoing type using the digital image processing apparatus, there are available a method structured as shown in FIG. 1A such that characters and figures are reproduced from pattern data corresponding to each pixel of the characters and figures; and a method structured as shown in FIG. 1B such that characters and figures are reproduced from codes corresponding to the characters and figures. Referring to FIG. 1A, pattern data in a hatched line portion of interest is formed into a pulse signal including pulses corresponding to solid pixels. In FIG. 1B, the overall portion of one character "A" corresponds to a code (for example, 00100000001).

Since the method shown in FIG. 1A has configured such that each pixel has data, precise expression can be performed and satisfactory degree of freedom can be obtained in display. However, there arises a problem in that a large capacity memory is required. Thus, the method shown in FIG. 1B has been used widely in recent years.

An example of display performed by the method shown in FIG. 1B is shown in FIG. 2. Video signal S1 is supplied to an input terminal 11. The video signal S1 supplied to the input terminal 11 is supplied to an input terminal of a memory 12 and one of input terminals of a video processor 13. The memory 12 stores the video signal S1 for one frame. The memory 12 reads a video signal S2 for one frame, preceding to the video signal S1 supplied through the input terminal 11 by one frame so as to output the video signal S2 to another input terminal of the video processor 13. The video processor 13 performs, for example, a motion adapted 3D Y/C separation process. The video processor 13 subjects the input video signal S1 and the video signal S2 output from the memory 12 to a video process so as to output a video signal S3 subjected to the video process to one of input terminals of a selector 14. Pattern data is supplied to another input terminal of the selector 14.

Pattern data is read out from a code generator 22 in response to a timing signal S4 generated from a timing generator 16. The timing generator 16 generates appropriate timing signals S4, S5 and S7 in response to horizontal and vertical synchronizing signals H and V supplied to a terminal 17 in order to cause a pattern to be displayed at a desired position in one image. A signal S11 output from the code generator 22 and including code data is supplied to a display memory 23. Code data in the display memory 23 is read in response to the timing signal S5 generated by the timing generator 16. Thus-read code data is supplied to a character ROM 24 so that a character and/or figure pattern corresponding to the code is generated. The output from the character ROM 24 is supplied to a display controller 19. The display controller 19 subjects supplied pattern data to the Y/C separation process and the like so as to output Y, I and Q signals (or R, G and B signals) as signal S8. The output signal S8 from the display controller 19 is supplied to another input terminal of the selector 14.

The selector 14 switches the signal S8 supplied from the display controller 19 and including pattern data and the video signal S3 supplied from the video processor 13 in response to the timing signal S7 output from the timing generator 16 so that the characters and figures are displayed at desired positions in one image. Output signal S9 from the selector 14 is supplied to an RGB signal converter 20 so as to be subjected to a conversion process. The RGB signal converter 20 subjects the supplied signal S9 to an R, G and B signals process so as to generate red, green and blue signals R, G and B so as to output the R, G and B signals to a monitor (not shown) through a terminal 21. If the display controller 19 outputs the R, G and B signals, the RGB signal converter 20 can be omitted.

As a matter of course, the above-mentioned display method involves the degree of precision of displayed characters and figures being different based on the quantity of pattern data of the characters and figures corresponding to the codes. That is, although the memory capacity can be reduced if the quantity of data is reduced, characters and figures are displayed in the form of rough mosaic images. Thus, the image quality deteriorates. If the quantity of data is enlarged, precise characters and figures can be displayed. However, a large memory is required and, thus, the size of the circuit is enlarged. As a result, an economical disadvantage takes place. Since only patterns stored in the character ROM 24 can be displayed, the characters and figures to be displayed have unsatisfactorily small degree of freedom. If a plurality of characters and figures are enabled to be displayed, a great memory is required.

As described above, the conventional digital image processor requiring a large memory when precise characters and figures are displayed has a problem of structural and economical disadvantages.

BRIEF SUMMARY OF THE INVENTION

Accordingly, it is an object of the present invention to provide a digital image processor which is capable of expressing precise figures and characters without a large capacity memory.

According to one aspect of the present invention, there is provided a digital image processor comprising pattern generating means for generating pattern data in accordance with horizontal and vertical synchronizing components of an input video signal, a memory for storing the video signal and pattern data generated by the pattern data generating means, address generating means for generating write address and read address to be supplied to the memory in accordance with the horizontal and vertical synchronizing components of the video signal, signal discrimination means for discriminating whether the output read from the memory is a video signal or pattern data, pattern data processing means for processing the output read from the memory and discriminated to be pattern data by the signal discrimination means, video signal processing means for processing the output read from the memory and discriminated to be video signal by the signal discrimination means, and data process switching means for selecting one of the output from the pattern data processing means and the output from the video signal processing means in accordance with a result of discrimination performed by the signal discrimination means.

According to the present invention, one memory is used as a shared manner as the memory for processing the video signal and the memory for displaying the pattern data. Therefore, precise figures and characters can be expressed without a large capacity memory.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 4 is a diagram showing a pattern data table provided for a pattern data processor according to the first embodiment;

FIGS. 5A and 5B show examples of displayed screen according to the first embodiment;

DETAILED DESCRIPTION OF THE INVENTION

A preferred embodiment of a digital image processor according to the present invention will now be described with reference to the accompanying drawings.

Figure 1A:
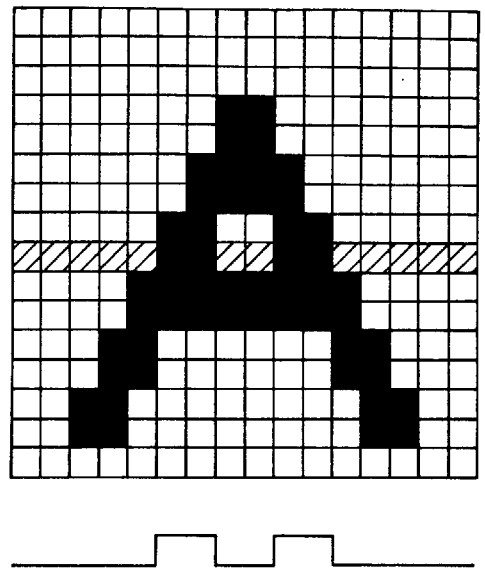
FIGS. 1A and 1B show principles of two methods for displaying characters and figures.
Figure 1B:
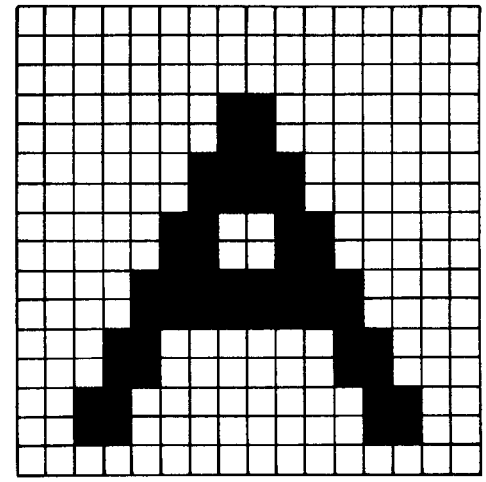
Figure 2:
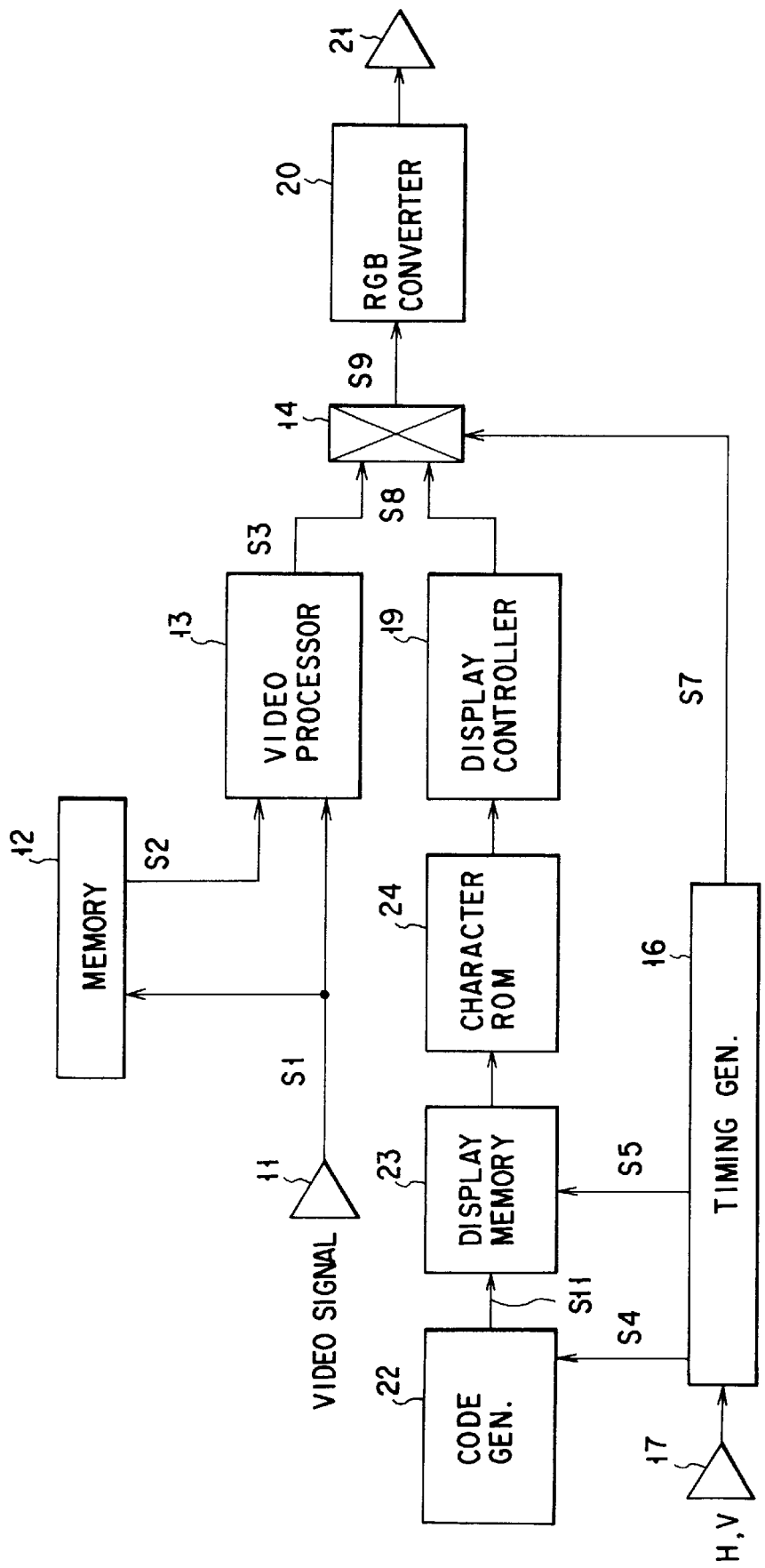
FIG. 2 is a block diagram showing a conventional digital image processor using the method shown in FIG. 1B.
Figure 3:
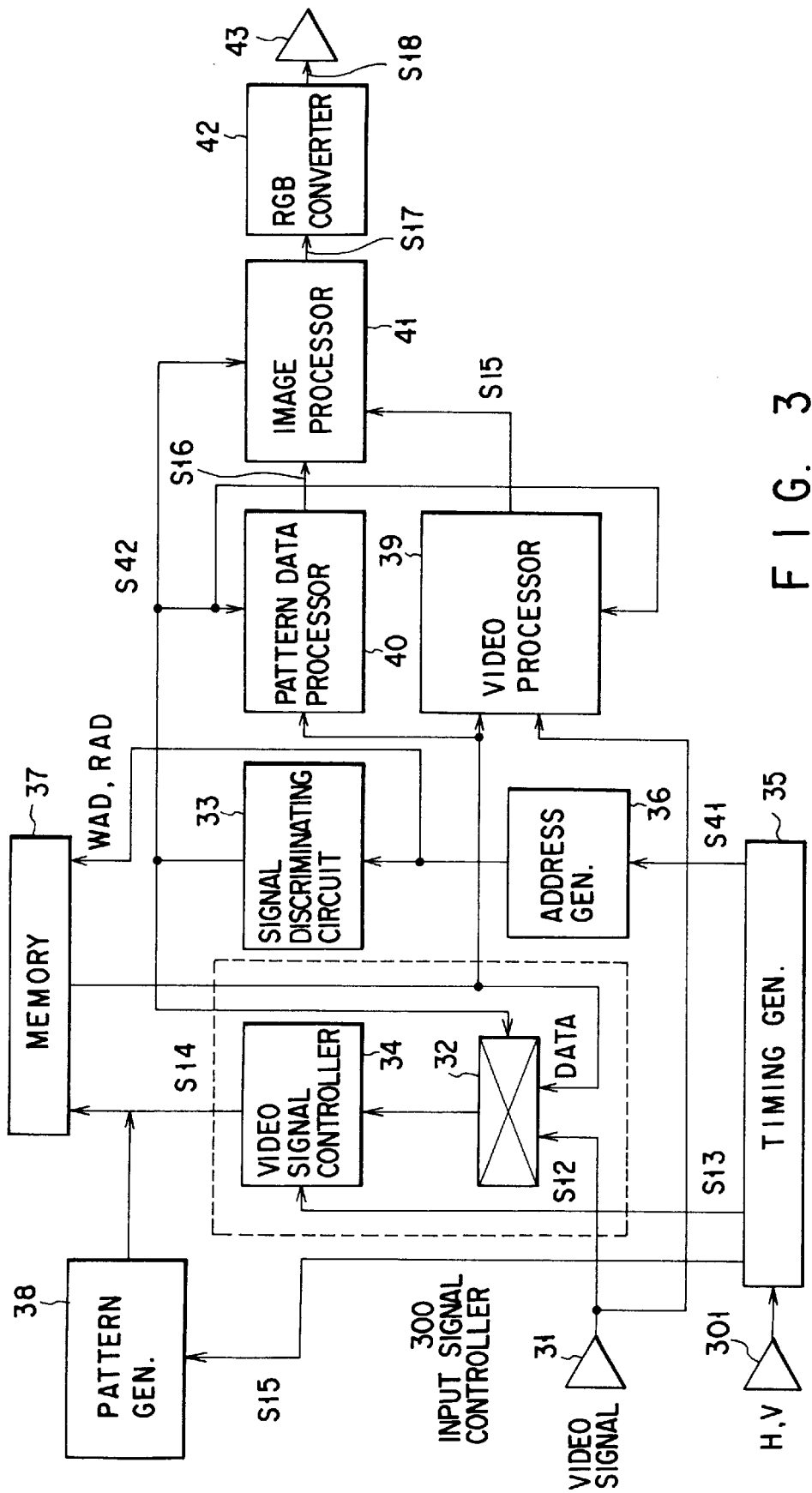
FIG. 3 is a block diagram showing the structure of a first embodiment of a digital image processor according to the present invention.

Referring to the drawings, an embodiment of a digital image processor according to the present invention will now be described. FIG. 3 is a block diagram showing the structure of a first embodiment.

A video signal (a digital signal) S12, such as a television signal, supplied to an input terminal 31 is supplied to one of input terminals of a selector 32 and a video processor 39. The selector 32 is controlled in accordance with an output from a signal discriminating circuit 33 to be described later to select and output one of the two inputs. Video signal S12 or output data from a memory 37 selected by the selector 32 is supplied to a video signal controller 34. In response to a timing signal S13 supplied from a timing generator 35 to be described later, the video signal controller 34 outputs an input signal (video signal S14) in only effective image periods of the video signal S12. In the periods except for the effective image periods, the video signal controller 34 is brought to a high impedance state, that is, a closed state when the pattern data from a pattern data generator 38 is input to the memory 37. That is, the timing generator 35 sets a high impedance state at the output of the pattern generator 38 in the periods except for the effective image periods. The video signal S14 output from the video signal controller 34 is written in a memory 37. The selector 32 and the video signal controller 34 form an input signal controller 300.

The timing generator 35 generates timing signals S13, S15 and S41 in response to horizontal and vertical synchronizing signals H and V supplied to a terminal 301. Each of the timing signals S13, S15 and S41 includes a signal indicating the effective image period of the video signal S12.

The memory 37 is connected to an output terminal of an address generator 36, the other input terminal of the selector 32 and an output terminal of the pattern generator 38. The address generator 36 generates write address WAD and read address RAD in response to the timing signal S41 generated by the timing generator 35. That is, the video signal S14 output from the video signal controller 34 is written in the memory 37 in the effective image period of the video signal S12 in accordance with the write address WAD generated by the address generator 36.

On the other hand, the pattern generator 38, in the periods except for the effective image periods of the video signal S12, outputs pattern data indicating characters and figures required to be displayed in response to the timing signal S15 output from the timing generator 35. In the effective image period, the pattern generator 38 is brought to a high impedance state, that is, a closed state. Therefore, pattern data is supplied to an input port of the memory 37 in the periods except for the effective image periods. As described later, the pattern generator 38 uses a CPU (Central Processing Unit) (not shown) to generate pattern data.

The address generator 36 generates write address WAD corresponding to the position in the screen at which pattern data is displayed. Also the write address is generated by using the CPU. Pattern data generated by the pattern generator 38 is, in accordance with the write address WAD supplied from the address generator 36, written at a desired position of the video signal S14 stored in the memory 37 in the periods except for the effective image periods of the video signal S12. Therefore, a pixel data of a video signal of one frame stored in the memory 37 and corresponding to the desired position is replaced with the pattern data.

Pattern data read from the memory 37 in accordance with the read address RAD supplied from the address generator 36 is supplied to another input terminal of the selector 32, another input terminal of the video processor 39 and the pattern data processor 40. The read address RAD supplied from the address generator 36 is also supplied to the signal discriminating circuit 33.

The signal discriminating circuit 33 discriminates whether the read address RAD is an address used in the effective image period or an address used in the period except for the effective image period. If the read address RAD is an address used in the effective image period, the signal discriminating circuit 33 outputs a video signal discrimination signal. If the read address RAD is an address used in the periods except for the effective image period, the signal discriminating circuit 33 outputs a pattern data discrimination signal. The discrimination signal S42 corresponding to a result of the discrimination is supplied to the selector 32, the video processor 39, the pattern data processor 40 and the image processor 41.

When the pattern discrimination signal has been supplied from the signal discriminating circuit 33 to the selector 32, the selector 32 selects the output from the memory 37 so as to output the pattern data to the video signal controller 34. When the video signal discrimination signal has been supplied to the selector 32, the selector 32 selects the video signal S12 supplied to the input terminal 31 so as to output the video signal S12 to the video signal controller 34. The video signal controller 34 writes, in the memory 37, the video signal S12 or pattern data selected by the selector 32.

The pattern generator 38 generates pattern data by using a software of the CPU (Central Processing Unit) (not shown). When pattern data is generated by using a software as described above, the processing speed will be reduced because the CPU must bear a heavy load to perform data transfer, pattern data generation and so forth even if a high speed CPU is employed. Therefore, pattern data cannot be generated sequentially in each field. Accordingly, this embodiment has a structure such that same pattern data is generated by the pattern generator 38 only one time. Then, pattern data among the output from the memory 37 is circulated from the memory 37, the selector 32 and the video signal controller 34 so as to be again written in the memory 37. As a result, a necessity of sequentially generating the same pattern data can be eliminated so that reduction in the processing speed of the CPU is compensated.

The video signal among the output from the memory 37 is supplied to the video processor 39, while pattern data is supplied to the pattern data processor 40. The data switching operation is performed in response to a discrimination signal output from the signal discriminating circuit 33. The video processor 39 performs, for example, the motion adapted 3D Y/C separation process. The motion adapted 3D Y/C separation process includes a 3D Y/C separation process for separating the video signal into a luminance signal and a chrominance signal by calculating a difference of the image signal between two successive frames (between a given frame and a next frame), a detection process for detecting the motion of the video signal by calculating a difference of the image signal between two successive frames and a difference of the image signal between the given frame and a frame after next, and a 2D Y/C separation process for separating the video signal into a luminance signal and a chrominance signal in the horizontal and vertical frequency regions.

That is, the video signal S12 supplied to the input terminal 31 and the video signal output from the memory 37 are separated into a luminance signal and a chrominance signal based on the difference of the image signal between two successive frames in a case where the result of the discrimination notified from the signal discriminating circuit 33 is the video signal. Moreover, the video signal S12 supplied to the input terminal 31 and the video signal output from the memory 37 are used to calculate the difference of the image signal between two successive frames and the difference of the image signal between the given frame and the frame after next so as to detect the motion of the image.

The video processor 39 separates the video signal S12 supplied to the input terminal 31 into a luminance signal and a chrominance signal in the horizontal and vertical frequency regions. The 3D Y/C separation process output and the 2D Y/C separation process output are mixed with each other by a degree corresponding to the motion of the video signal detected by the motion detection process. The result of the mixture is the motion adapted 3D Y/C separation process output.

The pattern data processor 40 may be a display controller for outputting, for example, Y, I and Q signals or R, G and B signals corresponding to pattern data. The display controller has a color pallet for outputting colors corresponding to the pattern data and a converter for converting the output from the color pallet into Y, I and Q signals or R, G and B signals. If pattern data has 3-bit information as shown in a pattern data table shown in FIG. 4, eight colors corresponding to pattern data are output from the color pallet. By supplying a control signal from outside, the number of colors which can be displayed can be made to be sixteen though the number of colors which can be displayed is eight. The colors which can be displayed are converted into Y, I and Q signals or R, G and B signals. In this embodiment, the Y, I and Q signals are employed.

The video signal S15 output from the video processor 39 and the signal S16 output from the pattern data processor 40 are supplied to an image processor 41. Also a result of discrimination which is the output from the signal discriminating circuit 33 is supplied to a control terminal of the image processor 41. In accordance with the result of the discrimination performed by the signal discriminating circuit 33, the image processor 41 classifies the video signal S15 output from the video processor 39 and the signal S16 output from the pattern data processor 40 into a video signal portion, a pattern data portion and periphery portion of pattern data, and then switches the processing for each region in order to control the display on the screen. If the motion detection is performed in the video processor 39 for a portion of the output from the memory 37 which has been replaced with the pattern data, the detection results in a motion image.

The motion detection operation is usually performed such that the result of the detection is extended to adjacent pixel. Therefore, a periphery of the pattern data which should be a still image, is discriminated as a motion image, as shown in FIG. 5A. If the video signal S15 in the periphery of the pattern data is subjected to a motion image processing, there arises a blur (noise). Accordingly, the pattern data processor 40 outputs an arbitrary signal for causing the periphery portion (the periphery portion of pattern data) of the portion discriminated to be pattern data by the signal discriminating circuit 33 to be a predetermined color, as shown in FIG. 5B. In place of the video signal S15 output from the video processor 39 which is the original output, the image processor 41 uses an output from the pattern data processor 40 for the periphery portion of pattern data. By replacing the video signal in the periphery portion of pattern data with a predetermined signal, an interference occurring due to an erroneous motion detection can be prevented.

The signal S17 output from the image processor 41 is converted into R, G and B signals S18 by the RGB signal converter 42 so as to be output to the monitor through a terminal 43. When the pattern data processor 40 outputs R, G and B signals, the RGB signal converter 42 can be omitted.

As described above, according to this embodiment, the memory 37 which is provided for performing the 3D Y/C separation process is also used to superimpose pattern data on the video signal. Therefore, any additional memory and any character ROM are not required. Therefore, a precise pattern exhibiting excellent degree of freedom can be displayed. When the same pattern data is to be repeatedly written in the memory, pattern data is generated only one time. Then, the pattern data is circulated such that the pattern data read from the memory is again written in the memory. Therefore, the load of the CPU relating to the pattern data generation can be reduced.

The foregoing embodiment has constructed such that the video signal and pattern data are written in the memory 37 by using the same input port; one of the inputs is made to the high impedance state in accordance with whether or not the time is in the effective image period; and the other input is written in the memory 37. However, another structure may be employed if the memory has two input ports in which the foregoing control is not performed and each signal may be written through the exclusive input port.

Other embodiments of the present invention will now be described. The same portions as those of the first embodiment will be indicated in the same reference numerals and their detailed description will be omitted.

Figure 6:
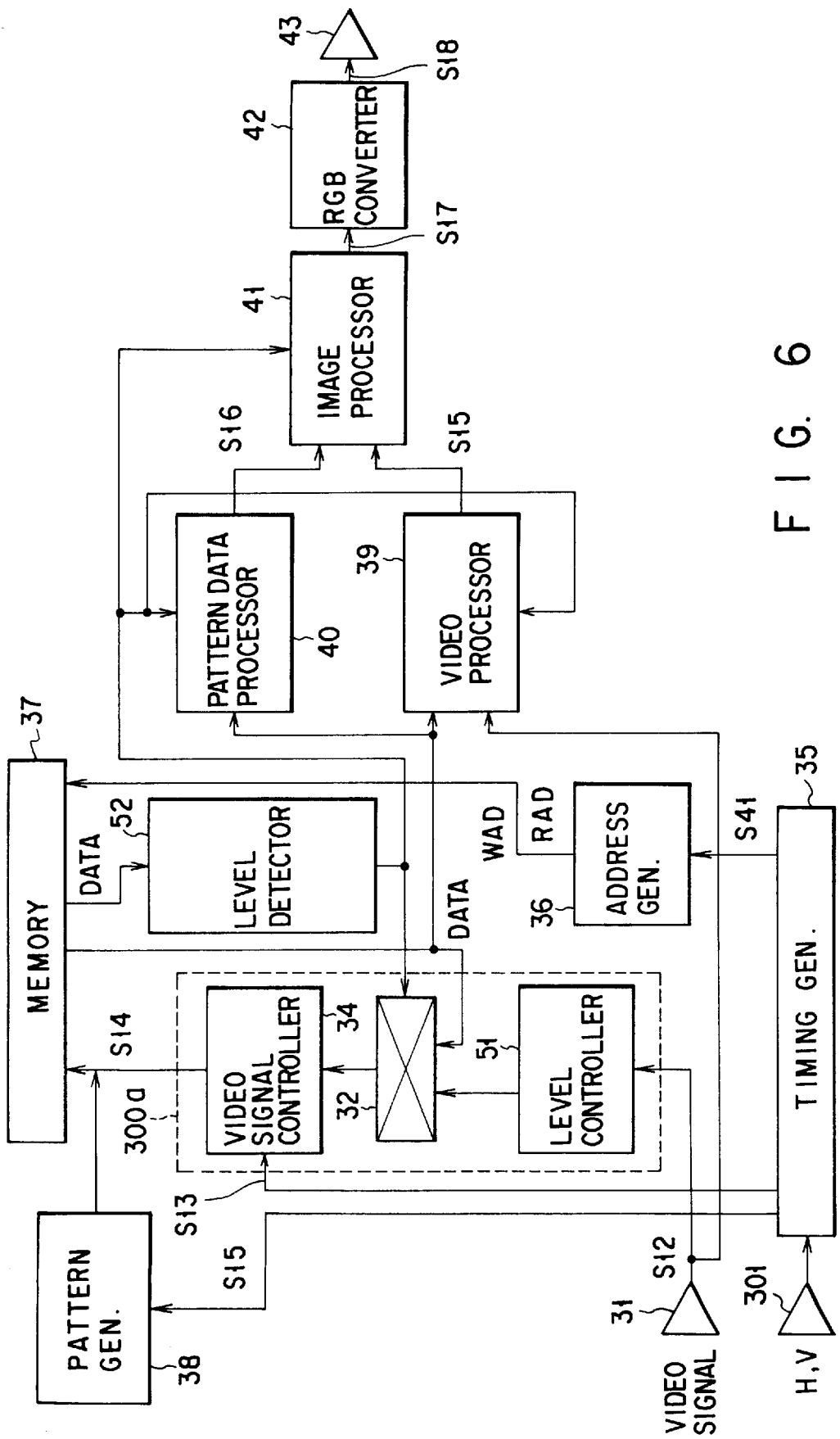
FIG. 6 is a block diagram showing the structure of a second embodiment of the present invention.

FIG. 6 is a diagram showing a second embodiment of the present invention. The embodiment shown in FIG. 6 is different from the first embodiment shown in FIG. 3 in that a level controller 51 is interposed and connected between the input terminal 31 and one of the input terminals of the selector 32. The level controller 51 forms an input signal controller 300a in association with the selector 32 and the video signal controller 34. Another difference is that a level detector 52 for discriminating the level of the output data from the memory 37 is provided in place of the signal discriminating circuit 33. The level detector 52 supplies a result of the discrimination to the control terminal of each of the selector 32, the video processor 39, the pattern data processor 40 and the image processor 41.

The video signal S12 supplied to the input terminal 31 is supplied to the level controller 51. The level controller 51 clicks the supplied video signal S12 with an arbitrary level. Pattern data generated by the pattern generator 38 is written over a portion of the video signal S12 except for the clipped range. Similarly to the above-mentioned embodiment, the memory 37 reads/writes data in accordance with the write and read addresses WAD and RAD supplied from the address generator 36.

Data read from the memory 37 is supplied to the level detector 52. The level detector 52 discriminates whether data is a video signal (data in the clipped range) or pattern data (out of the clipped range) in accordance with the level of output data from the memory 37. In accordance with a result of the discrimination output from the level detector 52, the selector 32 is operated similarly to the first embodiment. Also the image processor 41 is operated similarly to the first embodiment in accordance with the result of the discrimination output from the level detector 52. The signal S17 output from the image processor 41 is converted into the R, G and B signals S18 by the RGB signal converter 42 so as to be output to the monitor.

Figure 7:
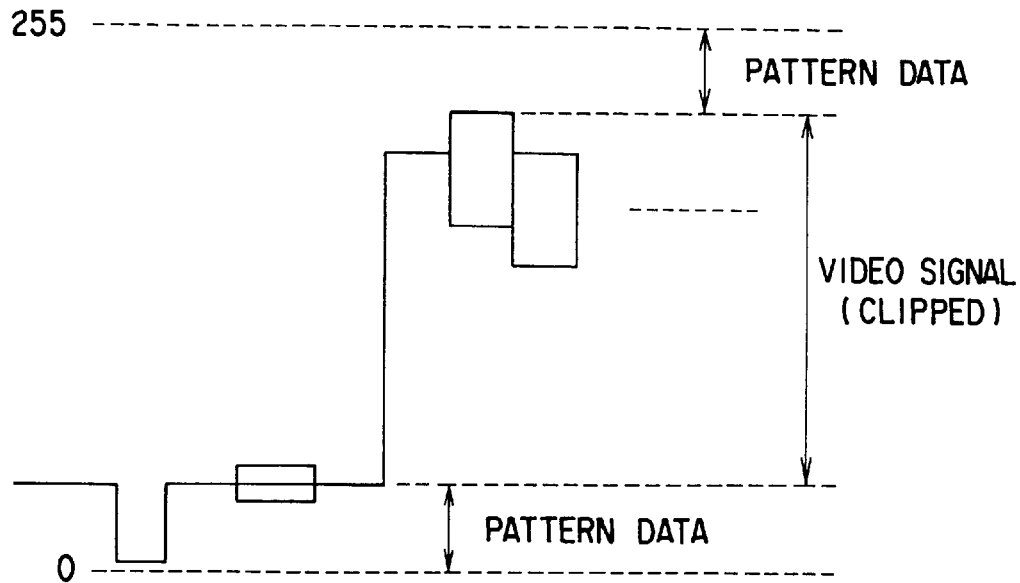
FIG. 7 is shows a process for clipping a video signal according to the second embodiment.

FIG. 7 shows an operation of clipping the video signal S12 performed by the level controller 51. In this case, the video signal. S12 is clipped at an arbitrary level by the level controller 51. As a result of the clipping operation, data in the arbitrary level is discriminated to be video data and that which is not included in the arbitrary level is discriminated to be pattern data.

As described above, according to the second embodiment, a portion of all of the levels of image data is assigned to pattern data so that the memory 37 for processing an image is as well as used to superimpose pattern data on the video signal. Therefore, any additional memory and any character ROM are not required. Therefore, a precise pattern exhibiting excellent degree of freedom can be displayed.

If the level of the video signal is controlled such that a portion of the levels can be assigned to pattern data when an analog video signal is A/D-converted, the level controller 51 can be omitted from the digital image processor.

Figure 8:
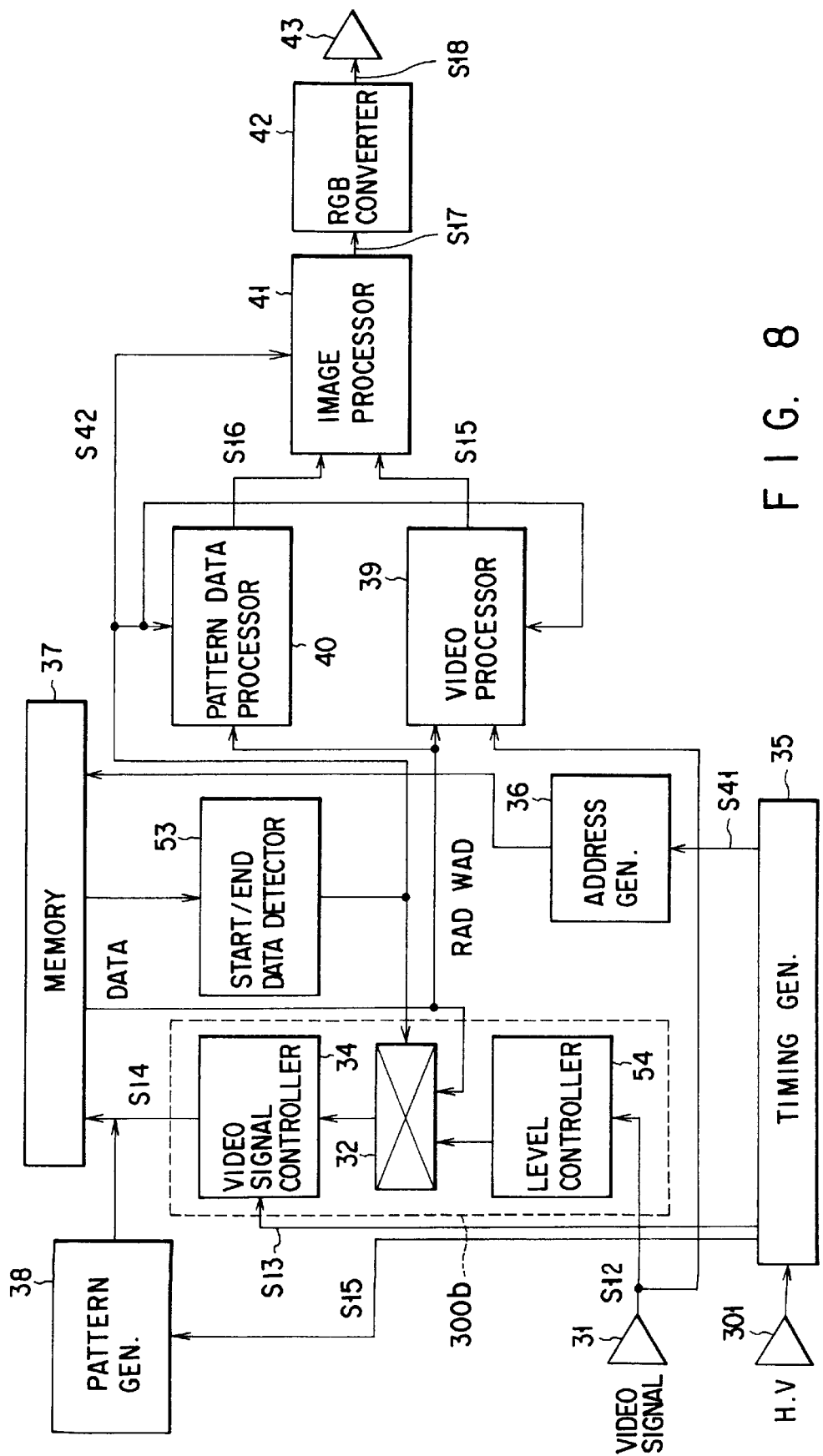
FIG. 8 is a block diagram showing the structure of a third embodiment of the present invention.

FIG. 8 shows a third embodiment of the present invention.

Referring to FIG. 8, the same elements as those shown in FIG. 6 are given the same reference numerals. The structure according to this embodiment is different from the second embodiment shown in FIG. 6 in that a start/end data detector 53 is provided in place of the level detector 52 and a level controller 54 is provided in place of the level controller 51.

The start/end data detector 53 detects start data and end data included in data read from the memory 37 to discriminate the signal. The video signal S12 supplied from the input terminal 31 is supplied to the level controller 54. The level controller 54 converts the supplied video signal S12 into numeric values and limits use of two values among the numeric values. One of two limited data items is used as start data of pattern data, while another data is used as end data. When the pattern generator 38 generates pattern data, the pattern generator 38 inserts start data and end data to the leading end portion and the trailing end portion of the pattern data. The video signal, which has been read from the memory 37 and over which pattern data has been partially written, is supplied to another input terminal of the selector 32, another input terminal of the video processor 39 and the pattern data processor 40.

Similarly to the first embodiment, the memory 37 reads/writes data in accordance with the write and read addresses WAD and RAD supplied from the address generator 36. Data read from the memory 37 is supplied to the start/end data detector 53. The start/end data detector 53 detects the start data and end data of the pattern data from the output of the memory 37 to discriminate data between the start and end data to be pattern data and other data to be a video signal. A result of the discrimination is supplied to the selector 32, the video processor 39, the pattern data processor 40 and the image processor 41.

In accordance with the result of the discrimination output from the start/end data detector 53, the selector 32 performs an operation similar to that according to the first embodiment. In accordance with a result of the discrimination output from the start/end data detector 53, the image processor 41 selectively outputs the signal S15 output from the video processor 39 and the signal S16 output from the pattern data processor 40. The output signal is converted into the R, G and B signals S18 by the RGB signal converter 42 so as to be output to the monitor.

Figure 9:
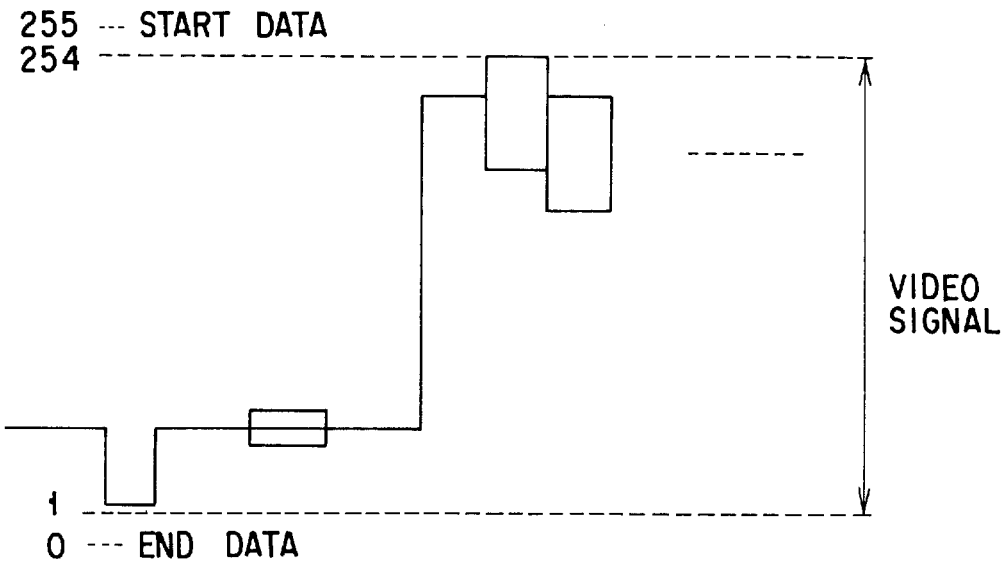
FIG. 9 shows control of the level of a video signal according to the third embodiment.
Figure 10:
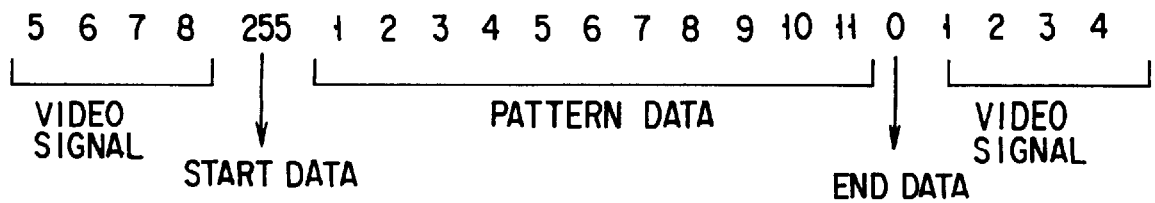
FIG. 10 shows a state of data to be written in a memory according to the third embodiment.

FIG. 9 shows a state where the start data and end data are assigned by the level controller 54. The video signal S12 supplied to the level controller 54 is converted to, for example, 256 numerical value levels formed by 8 bits. Among the 256 numerical value levels, use of 255 which is the highest signal level and that of 0 which is the lowest signal level are inhibited. The signal level 255 is made to be the start data of pattern data, while the signal level 0 is made to be the end data of pattern data. As shown in FIG. 10, the start data and end data are written in the front end and rear end portions of the pattern data generated by the pattern generator 38.

As described above, the level of video data is limited and the levels of the video signal, the use of which are inhibited, are used as the start data and end data. Thus, data between the start data and end data output from the memory 37 can be discriminated to be pattern data. By controlling the level of the video signal to enable a given level to be assigned to pattern data when the analog video signal is A/D-converted similarly to the second embodiment, the level control in the digital image processor may be omitted.

As a result of the foregoing process, a portion of the memory 37 for use to process the video signal can be used as the memory portion for memorizing the pattern data.

Figure 11:
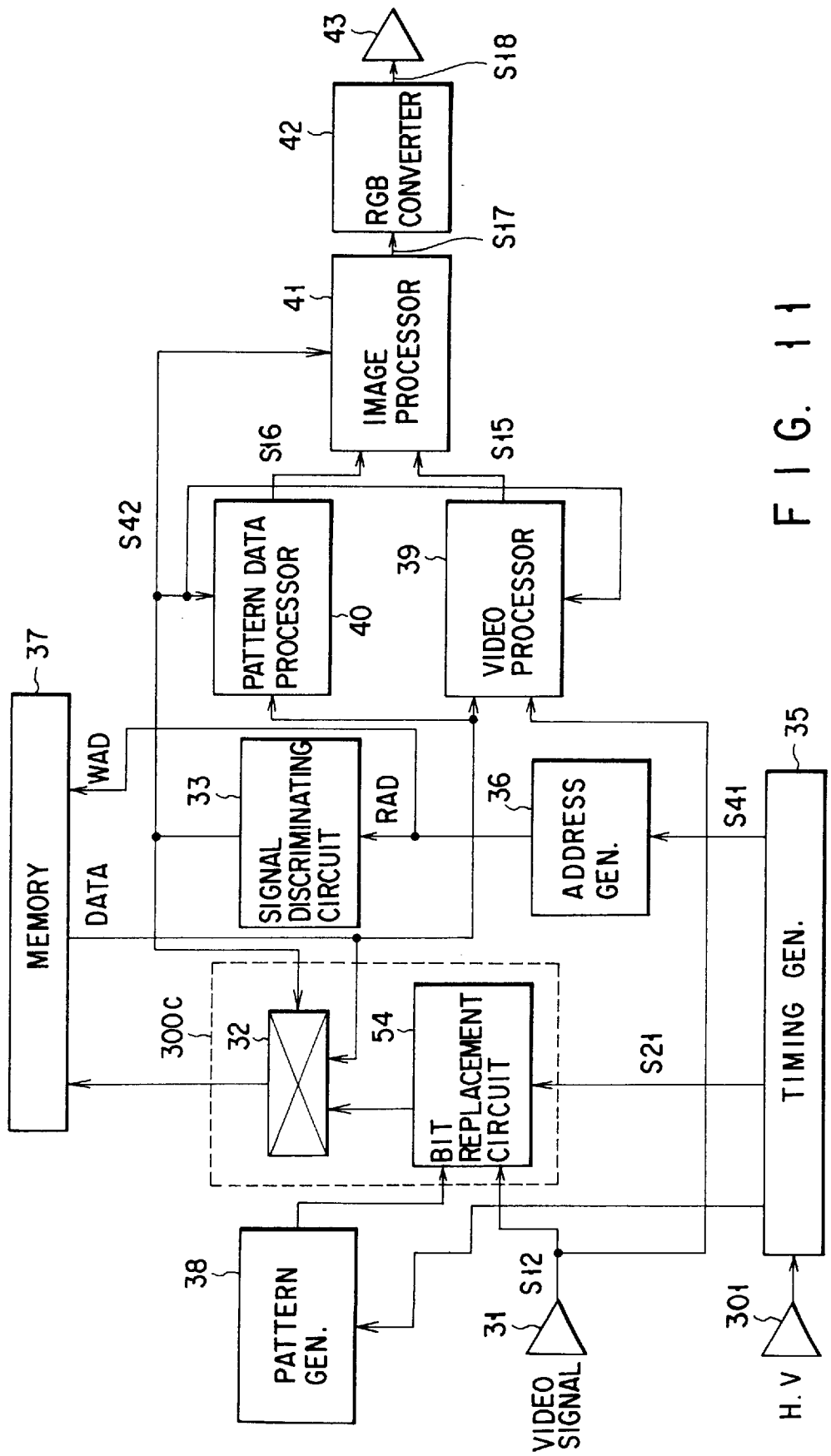
FIG. 11 is a block diagram showing the structure of a fourth embodiment of the present invention.

FIG. 11 shows a fourth embodiment of the present invention.

Referring to FIG. 11, the same elements as those shown in FIG. 3 are given the same reference numerals. The fourth embodiment is different from the first embodiment shown in FIG. 3 in that a bit replacement circuit 54 is connected between the input terminal 31 and one of the input terminals of the selector 32. The video signal S12 supplied through the input terminal 31 and pattern data generated by the pattern generator 38 are supplied to the two input terminals of the bit replacement circuit 54. The bit replacement circuit 54 is operated in response to the timing signal S21 generated by the timing generator 35. This embodiment is different from the first embodiment in that the video signal controller 34 is omitted.

The bit replacement circuit 54 replaces lower bits of the video signal S12 corresponding to the display position of the pattern data with the pattern data based on the timing signal S21. The arbitrary bit of pattern data can be used as pattern data discriminating bit. In comparison to the first to third embodiments having the structure such that all bits of the video signal are replaced with pattern data, the fourth embodiment has constructed such that only a portion of bits of the video signal is replaced with pattern data.

The output from the bit replacement circuit 54 which is selected by the selector 32 is written in the memory 37 in accordance with the write address WAD generated by the address generator 36. Data is read from the memory 37 in accordance with the read address RAD generated by the address generator 36 and the read data is supplied to another input terminal of the selector 32. In accordance with the read address RAD generated by the address generator 36, the signal discriminating circuit 33 discriminates whether or not the lower bit output from the memory 37 includes pattern data. In the case where an arbitrary bit of pattern data supplied from the pattern generator 38 is used as the bit for discriminating pattern data, the arbitrary bit can be used to discriminate the signal in the signal discriminating circuit 33. The signal discriminating circuit 33 supplies the discrimination signal S42 for selecting the signal to the selector 32.

When the discrimination signal S42 indicating that data supplied from the memory 37 is the pattern data has been supplied to the selector 32, the selector 32 replaces the lower bit output from the bit replacement circuit 54 (i.e., the video signal) with the pattern data supplied from the memory 37. When the discrimination signal indicating that data supplied from the memory 37 is the video signal has been supplied to the selector 32, the selector 32, as it is, supplies the video signal supplied from the bit replacement circuit 54 to the memory 37.

The image processor 41 performs an operation similarly to that according to the first embodiment in response to the discrimination signal S42 output from the signal discriminating circuit 33. The method in which the lower bits of the video signal are replaced with the pattern data enables the motion to be somewhat detected also in the upper bit image portion which is not replaced with the pattern data. If the motion detection can be performed, a correct motion adapted operation can be performed without the process according to the first embodiment in which data in the periphery portion of pattern data is replaced with arbitrary data by the image processor 41.

Figure 12:
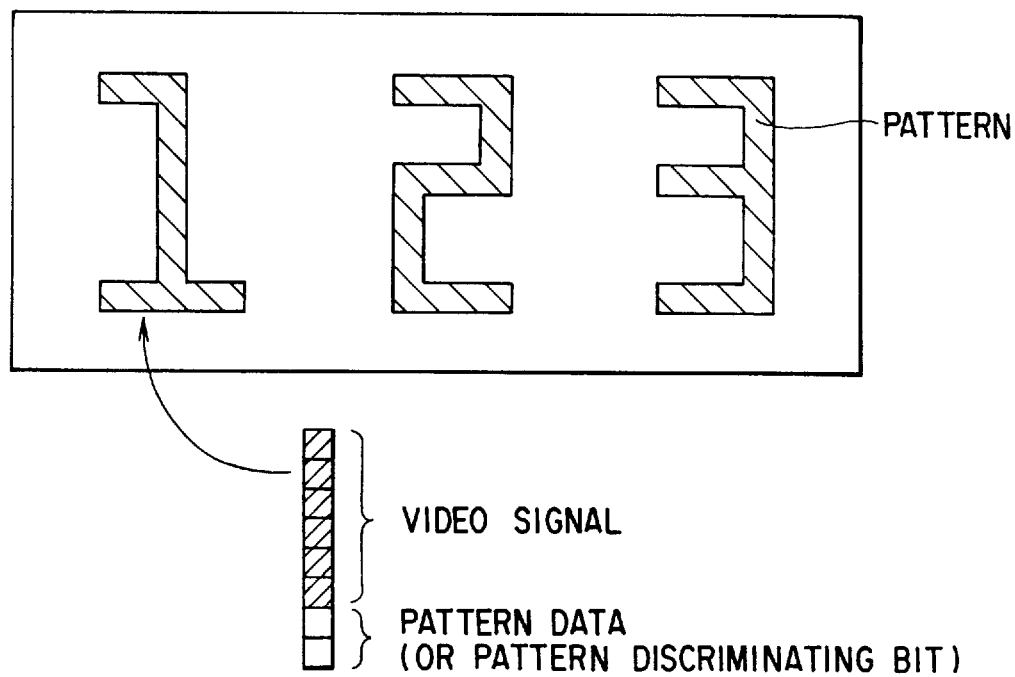
FIG. 12 shows a bit replacement process according to the fourth embodiment.

FIG. 12 shows a state where a specific bit of the video signal is replaced with the pattern data by the bit replacement circuit 54. The pattern data is replaced with two lower bits of the video signal corresponding to the position in the screen for displaying the pattern. That is, the fourth embodiment has constructed such that pattern data is not completely written over the video signal at the corresponding address. In this embodiment, only a specific bit of the video signal is replaced with pattern data. Therefore, this embodiment is also able to use the memory 37 for signal processing and pattern display though the number of colors for displaying the pattern is limited.

Figure 13:
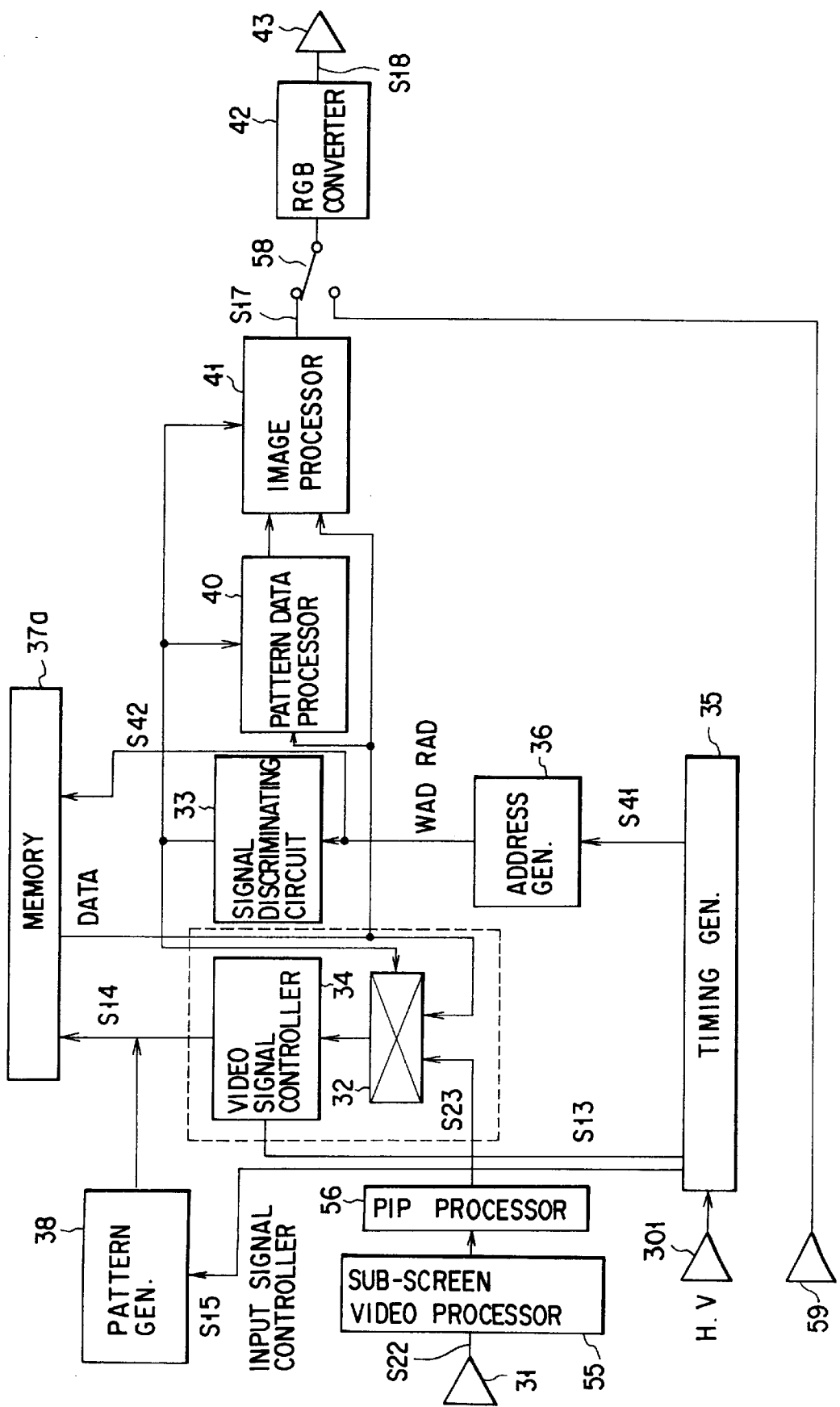
FIG. 13 is a block diagram showing the structure of a fifth embodiment of the present invention.

FIG. 13 shows a fifth embodiment of the present invention.

Referring to FIG. 13, the same elements as those shown in FIG. 3 are given the same reference numerals. This embodiment is different from the first embodiment shown in FIG. 3 in that a sub-screen video processor 55 and a PIP (picture-in-picture) processor 56 are connected between the input terminal (in this embodiment, the sub-screen video signal input terminal) 31 and one of the input terminals of the selector 32. The first to fourth embodiments have the structure such that the memory for the motion adapted 3D Y/C separation process is used as the memory for processing the image which is shared as the memory for displaying the pattern. In the fifth embodiment, however, a memory for a picture-in-picture (PIP) process is used as the memory for displaying the pattern.

That is, a sub-screen video signal S22 supplied to the input terminal 31 is supplied to the sub-screen video processor 55. The sub-screen video processor 55 subjects the supplied sub-screen video signal S22 to the Y/C separation process to separate the sub-screen video signal S22 into luminance signal Y and chrominance signal C. The luminance signal Y and the chrominance signal C respectively are supplied to the PIP processor 56. The PIP processor 56 performs a data sampling or thinning process and a filter process to compress the signal in the horizontal and vertical directions. The signal S23 compressed by the PIP processor 56 is supplied to one of the input terminals of the selector 32.

The process following the process performed by the selector 32 will be described about only the luminance signal for the convenience of the description. Note that also the chrominance signal can be performed by a method similar to that for the luminance signal. The output from the selector 32 is supplied to the video signal controller 34. In response to a timing signal generated by the timing generator 35, the video signal controller 34 outputs the sub-screen video signal S24 in only the effective image period of the video signal. The video signal controller 34 is brought to a high impedance state in periods except for the effective image period. The sub-screen video signal S24 output from the video signal controller 34 is written in a memory 37a in accordance with the write address WAD generated by the address generator 36. In a case where the timing signal S15 generated by the timing generator 35 indicates the period except for the effective image period, the pattern generator 38 outputs pattern data to the input port of the memory 37a. In a case where the video signal S15 indicates the effective image period, the pattern generator 38 is brought to the high impedance state.

The address generator 36 generates write address which is the same as that of the sub-screen video signal corresponding to the position in the screen for displaying the pattern data and writes the pattern data over the sub-screen video signal stored in the memory 37a. In order to display a sub-screen at an arbitrary position in the main screen, data is read from the memory 37a in accordance with the read address RAD supplied from the address generator 36. The read address RAD generated by the address generator 36 is also supplied to the signal discriminating circuit 33 so as to be used to discriminate whether data read from the memory 37a is a video signal or pattern data. Data output from the memory 37a is supplied to another input terminal of the selector 32.

If a result of the discrimination performed by the signal discriminating circuit 33 indicates pattern data, the selector 32 selects the output (pattern data) from the memory 37a. If the result is determined to be the video signal, the selector 32 selects and derives the output from the PIP processor 56.

If a result of the discrimination indicates the video signal, data output from the memory 37a is supplied to another input terminal of the image processor 41. If the result indicates pattern data, data output from the memory 37a is supplied to the pattern data processor 40. The signal S16 output from the pattern data processor 40 is supplied to another input terminal of the image processor 41. The discrimination signal output from the signal discriminating circuit 33 is also supplied to a control terminal of the image processor 41. In accordance with the discrimination signal S42 supplied from the signal discriminating circuit 33, the image processor 41 classifies data supplied from the memory 37a and the signal S16 supplied from the pattern data processor 40 into the video signal portion, the pattern data portion and the periphery portion of pattern data so as to control data and the signal S16. The signal S17 output from the image processor 41 is supplied to a sub-screen terminal of a main-screen switch 58. A main-screen signal is supplied from an input terminal 59 to a main-screen terminal of the main-screen switch 58. The output from the switch 58 is converted into the R, G and B signals S18 by the RGB signal converter 42, and then output to the monitor (not shown).

The PIP process is performed such that one or more sub-screens are displayed in the main screen. The PIP process includes a double window operation for separating the main screen into two sections. The PIP process is able to switch the channel in sub-screen units at each time or move a plurality of sub-screen in the main screen. The PIP process may be performed by software or hardware.

In the fifth embodiment, the PIP processor 56 has the memory for the luminance signal and that for the chrominance signal. Since the chrominance signal has a low level as compared with the level of the luminance signal, more signal levels can be assigned to the pattern data in a case where, for example, the level of the video signal is limited and the limited level is assigned to the pattern data as is performed in the second embodiment. When the PIP function is not used, the memory 37a for the PIP process can fully be used as the memory for displaying pattern data.

As described above, according to the present invention, the video signal and pattern data are written in the same memory in such a manner that they can be discriminated later. The video signal and pattern data are discriminated from the output from the memory so as to be subjected to different processes. Therefore, a digital video processing apparatus which does not require a large capacity memory and which is capable of expressing precise characters and figures can be provided.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the foregoing independent embodiments may be combined arbitrarily. The present invention, which can be applied to the motion adapted 3D Y/C separation process and the PIP process, can be applied to a video signal processing means using a memory for performing a video signal process, for example, sequential scan conversion, scanning line conversion, noise reducer in the frames.

Figure 14:
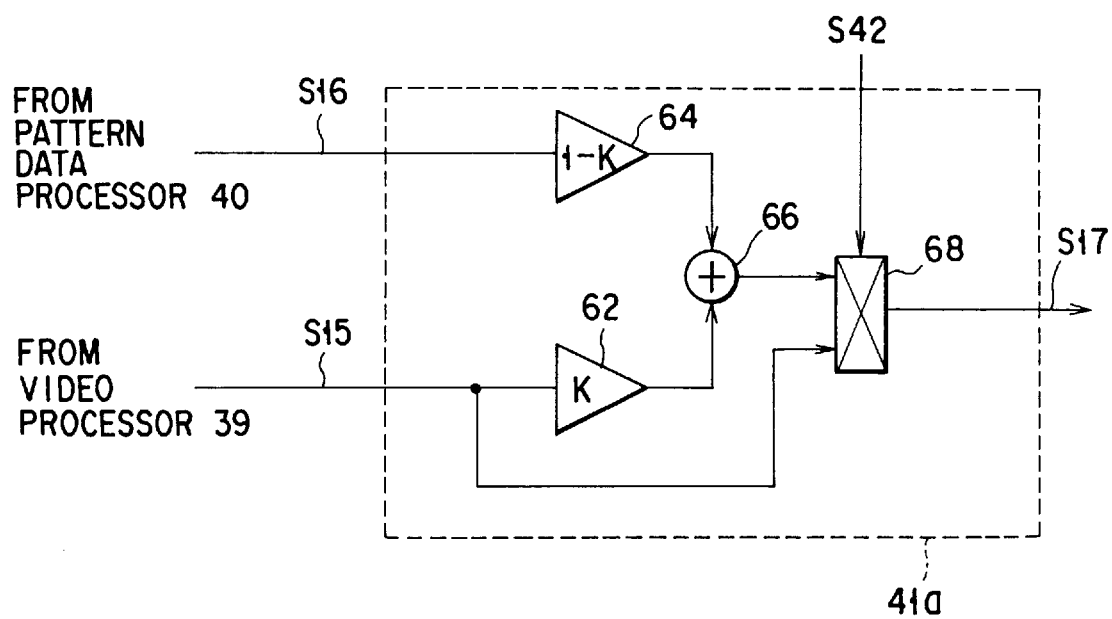
FIG. 14 is a block diagram showing the structure of a data process switching circuit according to a modification of the present invention.

In the foregoing embodiments, the pattern is completely superimposed over the image. However, the pattern may be superimposed in such a manner that the image is somewhat left and transparent. This function can easily be realized by changing the image processor 41 according to each embodiment as shown in FIG. 14.

Outputs from the video processor 39 and the pattern data processor 40 are supplied to a data processor 41a. In the data processor 41a, the video signal output from the video processor 39 is supplied to a first amplifier (amplification ratio: K) 62, while pattern data output from the pattern data processor 40 is supplied to a second amplifier (amplification ratio: 1–K) 64. Outputs from the two amplifiers 62 and 64 are mixed by a mixer 66, and then supplied to a first input terminal of a selector 68. The video signal supplied from the video processor 39 is, as it is, supplied to a second input terminal of the selector 68. In response to the discrimination signal S42, the selector 68 selects the output from the mixer 66 when characters and figures are to be displayed. When an image is to be displayed, the selector 68 selects the video signal supplied from the video processor 39.

As a result, characters and figures can be displayed in such a manner that the original video signal can somewhat be seen even if the characters and figures are displayed.

We claim:

1. A digital image processor comprising:
an input terminal for receiving a video signal;
pattern generating means for generating pattern data in accordance with horizontal and vertical synchronizing components of the video signal supplied to said input terminal;
a memory for storing the video signal supplied to said input terminal and the pattern data generated by said pattern data generating means;
address generating means for generating write address and read address to be supplied to said memory in accordance with the horizontal and vertical synchronizing components of the video signal supplied to said input terminal;

signal discrimination means for discriminating whether the output read from said memory is a video signal or pattern data;

pattern data processing means for processing the output read from said memory and discriminated to be pattern data by said signal discrimination means;

video signal processing means for processing the output read from said memory and discriminated to be video signal by said signal discrimination means; and data process switching means for switching the output from said pattern data processing means and the output from said video signal processing means in accordance with a result of discrimination performed by said signal discrimination means.

2. An apparatus according to claim 1, further comprising:

means for writing again pattern data read from said memory in said memory.

3. An apparatus according to claim 1, in which said video signal processing means comprises means for processing the video signal supplied to said input terminal.

4. An apparatus according to claim 1, in which said signal discrimination means comprises means for discriminating whether the output from said memory is pattern data or a video signal in accordance with the read address generated by said address generating means.

5. An apparatus according to claim 1, wherein said memory comprises means for writing over the pattern data on the video signal in a period except for an effective image period for the video signal; and said signal discrimination means comprises means for discriminating the output from said memory to be a video signal when the period is the effective image period for the video signal and the output from said memory to be pattern data when the period is a period except for the effective image period for the video signal in accordance with the read address generated by said address generating means.

6. An apparatus according to claim 1, wherein said memory comprises level control means for controlling the level of the video signal supplied to said input terminal to a predetermined level and writing the video signal; and said signal discrimination means comprises means for discriminating the output from said memory to be pattern data when the output level from said memory is out of the predetermined level and discriminating the output to be a video signal when the out level from said memory is included in the predetermined level.

7. An apparatus according to claim 1, wherein said pattern data generating means comprises means for generating data indicating start and end of the pattern data in addition to the pattern data; and said signal discrimination means comprises means for discriminating whether the output from said memory is a video signal or pattern data by detecting data indicating start and end of pattern data from the output from said memory.

8. An apparatus according to claim 1, wherein said memory comprises level control means for controlling the level of the video signal supplied to said input terminal to a predetermined level and writing the video signal;

said pattern data generating means comprises means for generating data out of the predetermined level as start and end data of the pattern data; and said signal discrimination means comprises means for discriminating the output from said memory to be a video signal or pattern data by detecting start and end data from the output from said memory.

9. An apparatus according to claim 1, wherein said memory is a memory for a 3D Y/C separation process.

10. An apparatus according to claim 1, wherein said memory is a memory for a picture-in-picture process.

* * * * *